United States Patent [19]

Feeken

[11] 4,262,883
[45] Apr. 21, 1981

[54] FENCE CONSTRUCTION FOR LIVESTOCK

[76] Inventor: Ronald H. Feeken, Comfrey, Minn. 56019

[21] Appl. No.: 93,306

[22] Filed: Nov. 13, 1979

[51] Int. Cl.³ .............................................. E04H 17,16
[52] U.S. Cl. ...................................... 256/25; 119/20; 256/23
[58] Field of Search ........................ 256/23, 24, 25, 73, 256/22, 21; 119/20

[56] References Cited

U.S. PATENT DOCUMENTS

| 2,371,921 | 3/1945 | Tucker | 256/22 X |
| 2,909,361 | 10/1959 | Dotson | 256/22 X |
| 3,202,401 | 8/1965 | Bastia | 256/24 X |
| 3,339,895 | 9/1967 | Kusel et al. | 256/22 |
| 3,783,968 | 1/1974 | Derry | 256/24 X |
| 3,815,877 | 6/1974 | Turner | 256/24 |

FOREIGN PATENT DOCUMENTS

| 27914 of 1897 | United Kingdom | 256/22 |
| 398750 | 9/1933 | United Kingdom | 256/22 |

Primary Examiner—Andrew V. Kundrat

Attorney, Agent, or Firm—Peterson, Palmatier, Sturm & Sjoquist, Ltd.

[57] ABSTRACT

The fence construction comprises any number of panels which include upper and lower angle members having vertical and horizontal flanges. A plurality of vertical rod members having straight shank portions and angled end portions are secured to the angle members by welding the angled end portions of the rod members to the vertical flanges and the shank portions to the edges of the horizontal flanges. Further included in the fence construction is any number of panel extenders which are releasably fastened to the ends of the panels, each extender comprising upper and lower strip members composed of horizontal portions and oblique portions twisted with respect to the horizontal portions, the oblique portions having threaded holes so that bolts can be threadedly carried therein and the free ends of the bolts bear against the upper and lower angle members to hold the extender in place. The extender in each instance further includes a vertical rod member, the upper and lower ends of which are engageable with suitable eye members.

13 Claims, 4 Drawing Figures

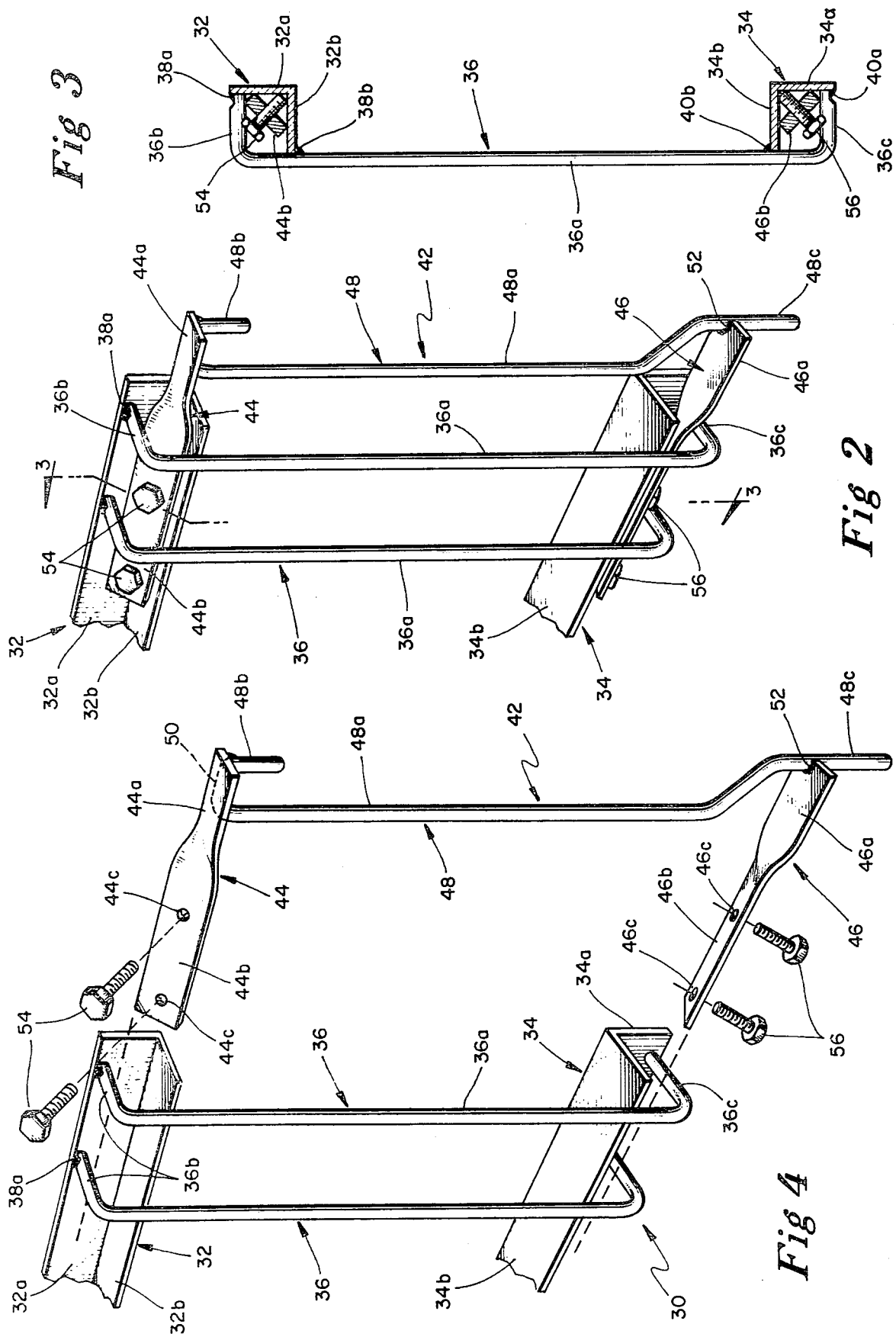

FENCE CONSTRUCTION FOR LIVESTOCK

BACKGROUND OF THE INVENTION

1. Field of the Invention

This invention relates generally to fences, and pertains more particularly to a fence construction especially suited for confining livestock.

2. Description of the Prior Art

Fence constructions for confining livestock are of course not completely new. A number of constructions have heretofore been employed. For the most part, these fence constructions with which I am familiar have been fabricated from tubular stock, either circular or rectangular in cross section. More specifically, upper and lower tubular rails are employed with vertical tubular posts welded at their upper and lower ends to the rails. In addition, panel extenders in the form of an appropriately configured rod member have been permanently welded to the ends of the upper and lower rails. In this way, the fence panels can be attached to floor posts, wall brackets and the like having thereon the proper type of eye members.

SUMMARY OF THE INVENTION

One object of the present invention is to provide a fence construction having particular utility for confining livestock which can be manufactured at a relatively low cost, both as far as the fabrication thereof is concerned and also as far as the cost of materials is concerned.

Another object of the invention is to provide a fence construction that will be rugged and which will adequately constrain both large and small animals.

A further object is to provide a fence construction composed of any number of panels that are fabricated in predetermined lengths, yet which panels can be cut to shorter lengths when circumstances so dictate.

Still another object of the invention is to provide a fence construction utilizing a panel extender for connecting the panel or panels to various supporting means which extenders are not permanently fastened to the panels themselves.

Also, the invention has for an object the provision of an extender that can be releasably fastened to a fence panel in accordance with my invention which does not depend upon any specific length of panel. Stated somewhat differently, when a panel has been shortened, by simply sawing off an end thereof, my extender can still be releasably fastened to the shortened panel.

Yet another object of the invention is to provide an extender that can be both readily attached and detached, and also which will be engageable with supporting means already on the market or already in actual use.

Briefly, my invention envisages the utilization of conventional angle members, frequently called angle irons, and rod members secured thereto by welding offset or angled end portions of the rods to the vertical flanges adjacent the free edges thereof and also the straight shanks of the rod members to the free edges of the horizontal flanges. In this way, rectangular spaces or openings are formed at the top and bottom of the resulting fence panel which are used to receive therein the oblique portions of upper and lower strip members which also have horizontal portions. Whereas an appropriately configured rod member is welded to the upper and lower horizontal portions of the strips, the rod member being engageable with appropriately designed eye members, the oblique portions are formed with threaded holes for the accommodation of bolts which, when tightened, cause their free ends to bear tightly against the upper and lower angle members, more specifically, where the vertical flanges integrally join the horizontal flanges. Thus, the extender or extenders when constructed in accordance with my invention are tightly clamped or held in place, but can be released when they are to be detached from a given fence panel.

BRIEF DESCRIPTION OF THE DRAWINGS

FIG. 2 is a slightly enlarged perspective view of one end of the fully depicted panel of FIG. 1, the view illustrating to better advantage the details of the panel extender.

FIG. 3 is a sectional view taken in the direction of line 3—3 of FIG. 2 for the purpose of showing even more clearly how the panel extender of FIG. 2 is releasably held in place, and FIG. 4 is an exploded perspective view corresponding generally to FIG. 2, but with the panel extender disengaged from the fence panel so as to even more clearly show the construction of the extender.

DESCRIPTION OF THE PREFERRED EMBODIMENT

Figure 1:
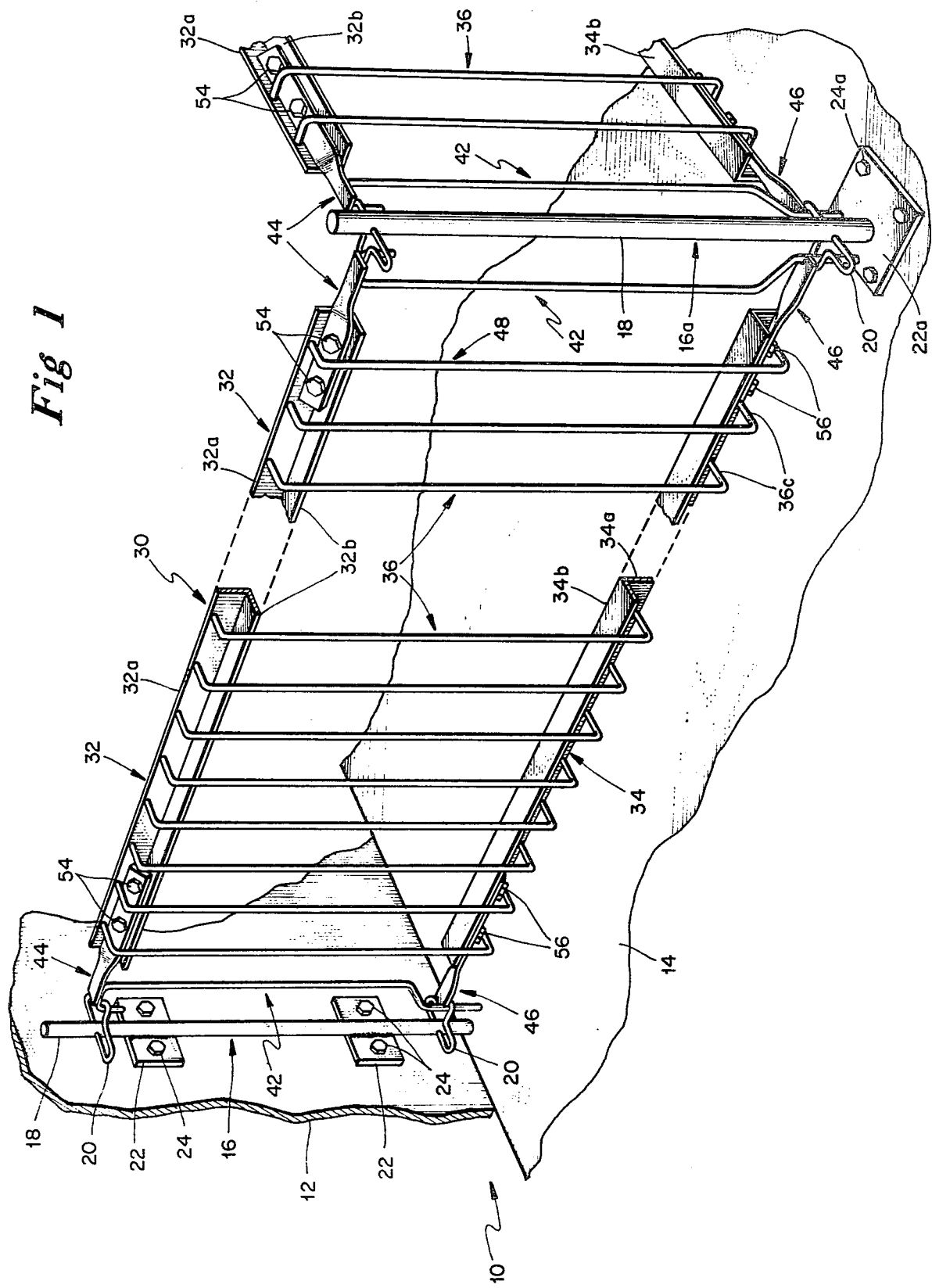
FIG. 1 is a perspective view showing my fence construction in actual use.

Although my invention will find usefulness in various situations, nonetheless it will possess an appreciable degree of utility in the confining of livestock and the like. Although my fence construction can readily be used outdoors, a portion of a building, such as a barn, has been fragmentarily shown in FIG. 1. In this regard, the building 10 comprises a wall 12 and a floor 14. The showing of the wall 12 enables a conventional wall bracket 16 to be illustrated. The wall bracket 16 includes a vertical tubular post 18 having two three-way eye members 20 welded thereto. Also welded to the tubular post 18 are mounting plates 22, each having holes therein for the accommodation of anchoring bolts or screws 24 which extend into the wall 12.

To further demonstrate the versatility of my fence construction yet to be described, attention is called to the use of a floor-mounted support 16a which includes a vertical tubular post 18 having welded thereto two three-way eye members 20. A base plate 22a is secured to the lower end of the post 18 and is anchored to the floor 14 by means of bolts or screws 24a.

It should be appreciated that the supporting structures 16 and 16a are conventional, and while not constituting part of my invention, nonetheless serve to illustrate how my invention coacts with panel supports already in existence.

Describing now the fence construction shown in FIG. 1 which exemplifies my invention, it will be noted that it includes a fence panel denoted generally by the reference numeral 30. The panel 30 comprises upper and lower angle members or angle irons 32 and 34, respectively. The upper angle member 32 includes a vertical flange 32a and a horizontal flange 32b, whereas the lower angle member 34 includes a vertical flange 34a and a horizontal flange 34b. An advantage stemming from the incorporation of angle members 32 and 34 in the panel 30 resides in the fact that the angle members are readily obtainable on the open market and require no special forming or fabricating. Inasmuch as the panel 30 is to provide a barrier for the livestock to be confined, any number of rod members 36 are employed, the rod members 36 having an appropriate spacing therebetween which is adequate to prevent the escape of the smallest animal that is to be confined. As can be seen from FIGS. 2-4, each rod member 36 has a straight shank portion 36a and angled upper and lower end portions 36b and 36c, respectively. More specifically, the end portions 36b and 36c are bent so as to extend perpendicularly from the vertical shank portion 36a.

While the number of vertical rod members 36, and the spacing therebetween, will depend upon the length of the panel 30 and also the size of the animal to be held captive, it will now be explained that the angled end portions 36b and 36c, when fabricating the panel 30, are abutted against the vertical flanges 32a and 34a of the upper and lower angle members 32 and 34, respectively. In actual practice, the extremities of the portions 36b and 36c are crimped in order to flatten somewhat the ends of these portions. For the sake of facile description, though, it will simply be assumed that the ends have been ground down somewhat so as to permit the end portions to be welded at 38a and 40a. It is not absolutely essential that flats be provided, but it will be appreciated that better welds 36a and 40a can be obtained by flattening the ends of the portions 36b and 36c of each rod member 36.

In addition to the various welds at 38a and 40a, additional welds are made at 38b and 40b. In this regard, the shank portions 36a engage the free edges of the horizontal flanges 32b and 34b. The welds 38b and 40b, as well as the welds 38a and 40a, can be literally tack welds which can be quickly effected. These welds 38a, 40a and 38b, 40b, very effectively secure the rod members 36 to the angle members 32 and 34 in the making of a rugged panel 30.

As perhaps best viewed in FIG. 3, it will be discerned that the section of the shank portion 36a extending above the horizontal flange 32b is parallel with the vertical flange 32a; by the same token, the section of the shank portion 36a extending below the horizontal flange 34b is parallel to the vertical flange 34a. Somewhat similarly, the end portion 36b extends parallel to the horizontal flange 32b, and the end portion 36c extends parallel to the horizontal flange 34b. The point to be appreciated is that rectangular openings or spaces are provided by such an arrangement as far as each rod member 36 is concerned. Use is made of these spaces or openings for the releasable attachment of a panel extender indicated generally by the reference numeral 42. The extender 42 includes upper and lower strip members 44 and 46, respectively. While these strip members 44 and 46 are somewhat similar, it should be understood that the strip member 44 has a horizontal portion 44a and an oblique portion 44b, whereas the strip member 46 has a horizontal portion 46a and an oblique portion 46b; the difference is that the portion 44b is twisted in one direction so as to permit its clamping to the upper angle member 32 and the portion 46b twisted in an opposite angular direction to enable the lower strip 46 to be clamped to the lower angle member 34. The oblique portion 44b of the upper strip member 44 is provided with two threaded holes 44c and the oblique portion 46b of the lower strip member 46 is similarly provided with threaded holes 46c. The purpose of the holes 44c and 46c will become more apparent hereinafter.

At this stage, attention is directed to a vertical rod 48 having a straight shank portion 48a and offset portions 48b, 48c. Actually, the upper portion 48b constitutes a hook and the bight thereof is welded to the underside of the horizontal portion 44a of the strip 44, the weld being denoted by the reference numeral 50. The lower portion 48c is welded at 52 to the horizontal portion 46a of the lower strip member 46. Hence, the strip members 44, 46 and the rod member 48 constitute an integral device, which has been labeled 42, as already explained.

Attention is now drawn to a pair of bolts 54 which are threadedly engaged with the holes 44c of the upper strip member 44. A second pair of bolts 56 is threadedly engaged in the holes 46c of the lower strip member 46. The purpose of the bolts 54 and 56 is to clamp or releasably hold the extender 42 in place. In this regard, it can be understood that the oblique or twisted portions 44b and 46b are inserted into the previously alluded-to openings or spaces formed by the end portions 36b and 36c of the two rightmost rod members 36. Thus, the oblique portions 44b and 46b are inclined so as to cause the bolts 54 and 56 to be directed angularly in the direction of the angle members 32 and 34, more specifically, to the apex or juncture of the vertical flanges 32a, 34a and 32b, 34b, respectively. When the bolts 54 and 56 are tightened, their free ends are forced against the angle members 32 and 34 so as to tightly hold the strip portions 44b and 46b in a fixed, yet releasable relation with the panel 30.

It should be understood that a precise fit of the oblique portions 44b and 46b within the openings or spaces that have been mentioned is not necessary. All that need result is that some surface section or edge of the oblique portions 44b and 46b react against either the angled portions 36b and 36c of either of the two rightmost vertical rod members 36, or even react against a section of the vertical shank portion 36a residing above the flange 32b as far as the upper strip 44 is concerned or below the horizontal flange 34b as far as the lower strip member 46 is concerned.

Once clamped to the panel 30 by tightening the bolts 54 and 56, it should be recognized that the panel 30 and the extender 42 are in readiness for actual use. Assuming for the sake of discussion that an extender 42 is releasably clamped to both ends of the fully shown panel 30, the extender at the left in FIG. 1 can be engaged with the bracket or support means 16, whereas the extender 42 at the right can be engaged with the support means 16a. To do this, all that is required is that the portions 48b and 48c (labeled in FIGS. 2 and 4) be inserted downwardly through the appropriate eye of the three-way eye members 20. In this way, the panel 30 is maintained in an upright or vertical condition.

To further illustrate the manner in which my invention can be employed, a second panel has been fragmentarily illustrated in FIG. 1, the second panel extending at right angles to the first panel. It will be appreciated, it is believed, that a section of the panel 30 has been removed so as to demonstrate that the panel 30 can be of any length that is desired. As an example, panel lengths of 20, 22 and 24 feet have been manufactured. Of course, one of the niceties of my invention is that irrespective of the initial length of the panel, it can be cut to a desired length by simply sawing through the upper and lower angle members 32 and 34, respectively, so as to leave a reduced length panel 30 of appropriate size. It should be further taken into account that the extender 42 can then be used with the reduced length panel. All that need be done is to insert the oblique portions 44b and 46b and then tighten the bolts 54 and 56.

I claim:

1. A fence construction comprising upper and lower angle members having vertical and horizontal flanges, and a plurality of vertical rod members having straight shank portions and angled end portions, the extremities of said end portions being welded to said vertical flanges at locations spaced vertically from said horizontal flanges and said shank portions being welded to the free edges of said horizontal flanges so that said shank portions are spaced horizontally from said vertical flanges.

2. A fence construction in accordance with claim 1 in which said extremities of said end portions are welded to said vertical flanges adjacent the free edges thereof.

3. A fence construction in accordance with claim 2 including means at one end of said upper and lower angle members for maintaining said shank portions vertical.

4. A fence construction in accordance with claim 3 in which said means includes an upper strip member receivable in the space provided by at least one rod member and the angle member to which it is welded.

5. A fence construction in accordance with claim 4 in which said means includes a lower strip receivable in the space provided by said one rod member and said one angle member.

6. A fence construction in accordance with claim 5 in which said strip members have a length sufficient to extend into the spaces provided by at least two rod members.

7. A fence construction in accordance with claim 6 in which said strips each have at least one threaded hole therein, and a bolt member threadedly received in said hole, the free end of each bolt member being engageable with the angle member with which its strip member is associated.

8. A fence construction in accordance with claim 7 in which said means includes an auxiliary vertical rod member welded to said strip members.

9. A fence construction in accordance with claim 8 in which each strip member includes a horizontal first portion and an oblique second portion, said oblique second portions being receivable in said spaces formed by said rod member and said angle members.

10. A fence construction in accordance with claim 9 in which said oblique portions each have a pair of threaded holes therein and a bolt member received in each of said pair of holes, the distance between holes of a pair of such holes corresponding generally to the spacing between said two rod members so that said oblique portions may be received in said spaces with one of said pair of bolts residing substantially midway between said two rod members and the other of said pairs of bolts similarly positioned between one of said two rod members and a third rod member.

11. A fence construction comprising upper and lower angle members having vertical and horizontal flanges, at least a pair of vertical rod members welded thereto and forming spaces with said angle members, a pair of strip members each having a first portion and a second portion, an additional vertical rod member secured to said first portions, and bolt means on said second portions for anchoring said strip members when said second portions are received in said spaces to maintain said additional rod member vertical.

12. A fence construction in accordance with claim 11 in which said bolt means includes a pair of bolts for each strip member, said second portions each having a pair of threaded holes therein for receiving said bolts.

13. A fence construction in accordance with claim 12 in which said second portions each have an oblique slope or inclination causing the free ends of said bolt members to engage apices located at the junctures of the vertical and horizontal flanges of said upper and lower angle members.

* * * * *